Nov. 20, 1962 W. K. FORTMAN 3,064,619
ACOUSTIC GENERATOR AND SHOCK WAVE RADIATOR
Filed March 11, 1960 6 Sheets-Sheet 1

WILLIAM K. FORTMAN
INVENTOR.

BY Andrew L. Bain
George B. Oujevolt
ATTORNEYS

Nov. 20, 1962 W. K. FORTMAN 3,064,619
ACOUSTIC GENERATOR AND SHOCK WAVE RADIATOR
Filed March 11, 1960 6 Sheets-Sheet 3
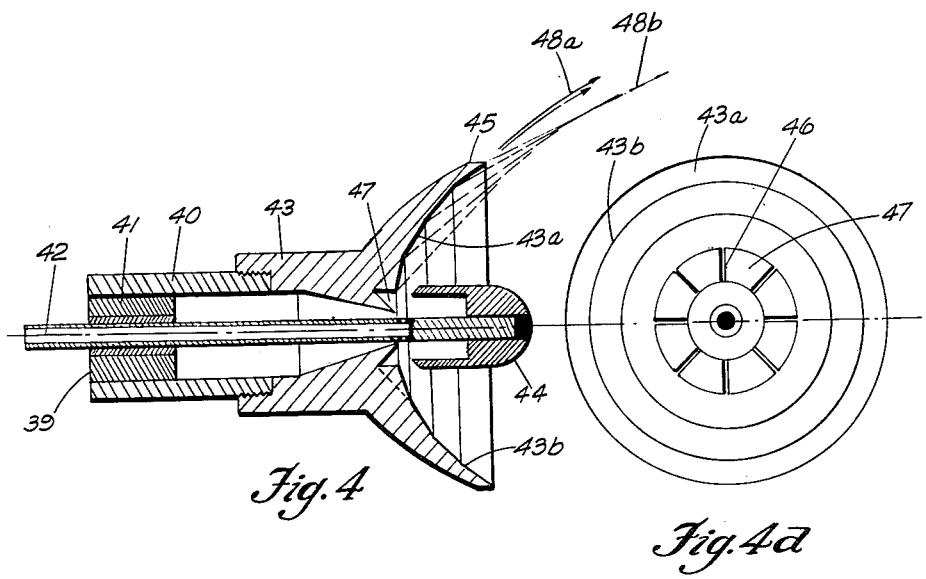
Fig. 4
Fig. 4a
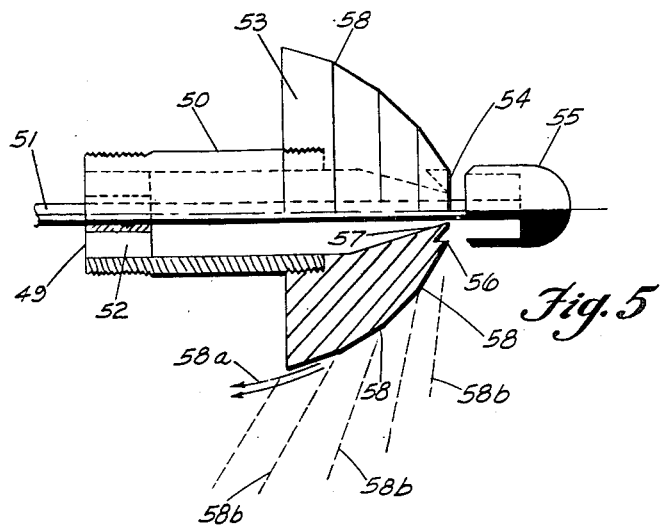
Fig. 5
WILLIAM K. FORTMAN
INVENTOR.
BY Andrew L. Bain
George B. Anjero(?)
ATTORNEYS

WILLIAM K. FORTMAN
INVENTOR.
ATTORNEYS

Nov. 20, 1962 W. K. FORTMAN 3,064,619
ACOUSTIC GENERATOR AND SHOCK WAVE RADIATOR
Filed March 11, 1960 6 Sheets-Sheet 5

WILLIAM K. FORTMAN
INVENTOR.

BY Andrew L. Bain
George B. Oryarott
ATTORNEYS

Nov. 20, 1962 W. K. FORTMAN 3,064,619
ACOUSTIC GENERATOR AND SHOCK WAVE RADIATOR
Filed March 11, 1960 6 Sheets-Sheet 6

WILLIAM K. FORTMAN
INVENTOR.

BY Andrew L. Bain
George B. Oujevolk
ATTORNEYS

United States Patent Office 3,064,619
Patented Nov. 20, 1962

3,064,619
ACOUSTIC GENERATOR AND SHOCK
WAVE RADIATOR
William K. Fortman, Metuchen, N.J., assignor to General
Precision, Inc., Little Falls, N.J., a corporation of Delaware
Filed Mar. 11, 1960, Ser. No. 14,394
13 Claims. (Cl. 116—137)

The present invention relates to the generation of audible and ultrasonic waves, and more particularly to an acoustic generator for the generation of audible and ultrasonic waves and shock waves as well as using these phenomena in a controlled manner in conjunction with the fluid medium used to generate these various waves.

It is well known that ultrasonic waves in the audible or ultrasonic range have many applications, mainly in gaseous media containing suspensions of fluid or solid aerosols where sound waves can cause the agglomeration of certain particles. Other valid applications exist in flame vibration in combustion studies where the aim is increased thermal efficiency. Work has also been done in the field of signalling, metallurgy, foam breaking and various chemical effects.

In the prior art devices, an energy conversion efficiency of between ten and twenty percent has been considered high. This is because much energy is lost by allowing the driving fluid to dissipate into the atmosphere at random after its release from the resonator cavity. Although many attempts were made to overcome the foregoing difficulties so as to obtain a more efficient energy conversion of the fluid jet, none, as far as I am aware, was entirely successful when carried into practice commercially on an industrial scale.

It has now been discovered that this problem can be overcome by utilizing this normally wasted energy in a novel manner to induce the gas containing or surrounding the processed material towards and past the sound source. The sound and shock waves moving at velocities far in excess of the material flow are insonating the onrushing material. In this manner the material is being assisted towards the sound source instead of being driven away because of the driving fluid pressure build up. This phenomena is of particular interest in treating dynamic gases in a column or duct where resistance to flow represents additional energy consumption. Heretofore, inducing sonic vibrations in flames has always presented problems due to the flame layer temperature gradients which present sound impedance barriers to any external sound source. However, means can now be provided so that the sound is generated within the flame envelope and can be maintained within the shock wave envelope generated by the enveloping Mach waves. Alternatively, where flames are in laminar layers above a disintegrating solid charge, a shock wave can be sent between the burning zone and the flame to cause a quicker gas release, turbulence and general physical disturbance increasing the burning rate.

The invention in its broader aspects contemplates providing in a Hartmann type generator, i.e., a jet opposed coaxially by a resonator, the generator of secondary resonance by reflection from a secondary resonance chamber or radiator to produce a sound of higher intensity, generate shock waves, and achieving other improved results.

It is an object of the present invention to provide a more efficient energy conversion of the fluid jet.

Another object of the present invention is to provide means for producing sound of higher intensity.

The invention also contemplates providing means for the generation of shock waves.

It is also the purpose of the invention to provide a simple device to accomplish the foregoing objects.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIG. 4 illustrates still another embodiment of a sound generator contemplated herein;

FIG. 4a is an end view of the device shown in FIG. 4;

Figure 6:
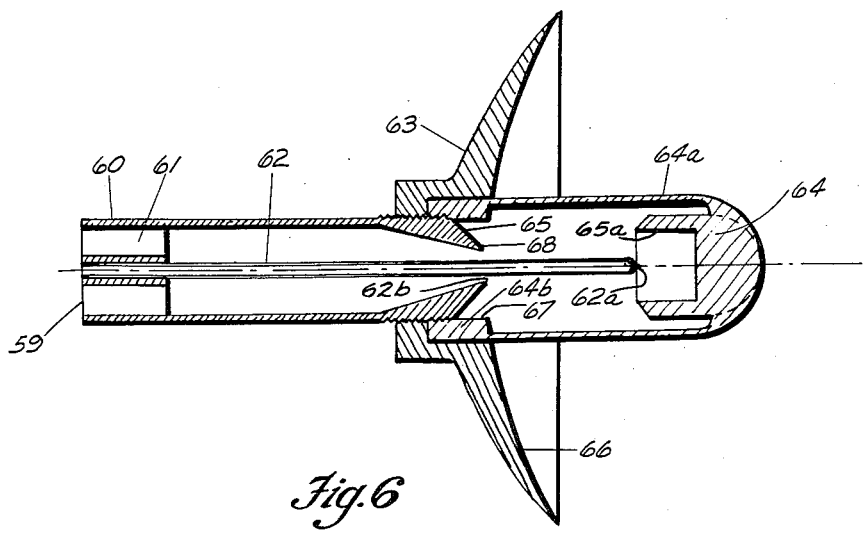
Figures 7, 7A:
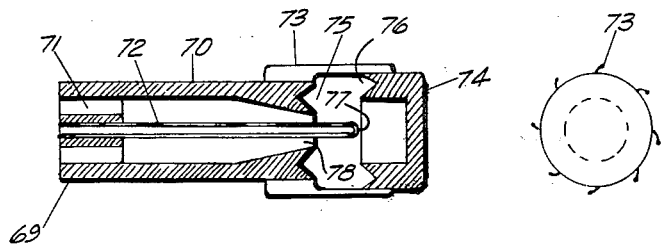
Figure 8:
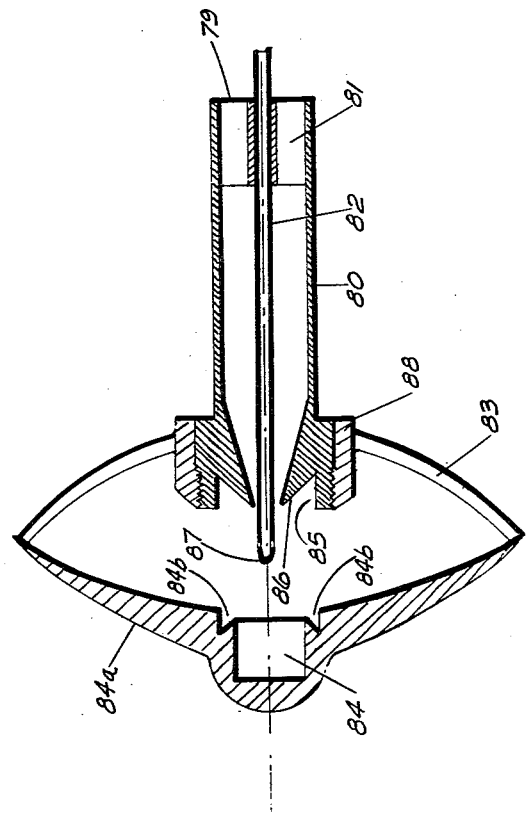
Figure 9:
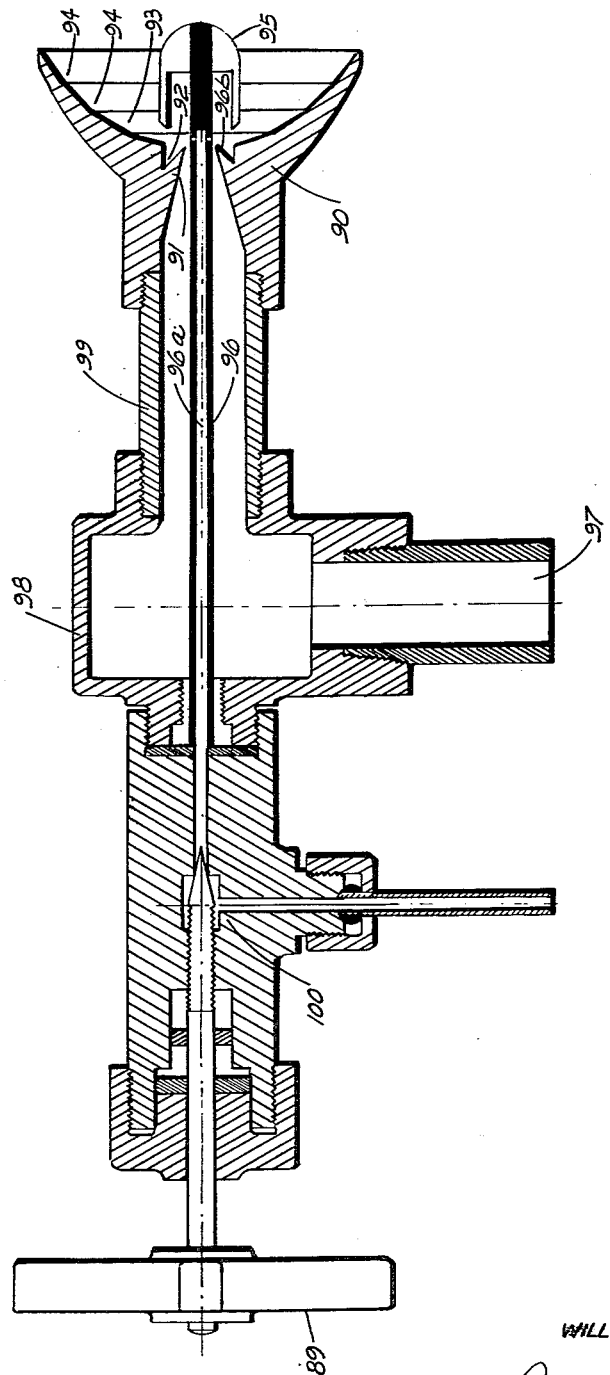

FIG. 5 gives a longitudinal cross-sectional view of yet another version of the invention herein contemplated;

FIG. 6 depicts a longitudinal cross-sectional view of another alternative arrangement of the invention;

FIG. 7 has a longitudinal cross-sectional view of a somewhat different embodiment of the invention;

FIG. 7a depicts the disposition of some of the components illustrated in FIG. 7 from an end view of the device shown in FIG. 7;

FIG. 8 shows a longitudinal cross-sectional view of still another embodiment of the device herein contemplated; and, FIG. 9 illustrates a longitudinal cross-sectional view of a device herein contemplated which is particularly useful when incorporated in the construction of a liquid fuel burner.

Generally speaking, the present invention contemplates the combination of a hollow stem within the nozzle of the sound generator and a second wave radiator, integral or separate from the nozzle. By means of the hollow stem, a second phase fluid can be delivered to the point of maximum sound intensity for the purpose of mixing, creating aerosols or forming beads or controlled particles as in spray drying and prilling operations. The radiator contemplated herein can be fabricated in a number of shapes: conical, convex, concave with smooth surfaces or milled with slots etc. The section through the boundary can also be formed in the shape of a polygon with edges formed by small angles, the purpose being to propagate shock waves separately or as a shock wave envelope. These shock waves can be directed either forward from the nozzle in a plane generally normal to the axis or in a reverse direction at different angles depending mainly on the shape of the shock wave radiator.

Figure 1:
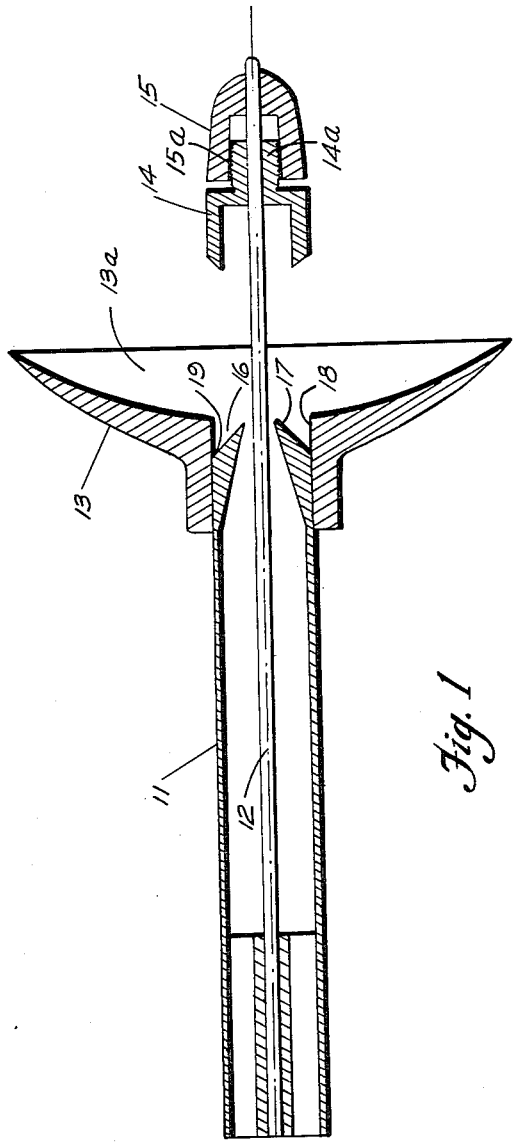
FIGURE 1 is a longitudinal cross sectional view of one embodiment of a stem generator contemplated herein.

In carrying the invention into practice, in FIGURE 1 the stem generator herein contemplated preferably comprises a nozzle 11, having a stem 12 passing through the length of the cylindrical nozzle 11 at the center thereof. Over the end of the nozzle there is disposed a concave radiator 13, machined with a close tolerance so that it can slide over the nozzle. The stem 12 passes through and out past nozzle 11 extending past concave radiator 13, and affixed to the end of stem 12 is a resonator 14 having a U-shaped cross-section, the open end of the U facing radiator 13, the stem 12 passing right through the middle of the U. The positioning of the resonator 14 may be adjustable, i.e., a threaded cup 15 may be provided with threads 15a adapted to receive a threaded end 14a on the resonator. The secondary resonance chamber or second radiator 16 herein contemplated may comprise a tapered mouth 17 surrounding nozzle 11, and the inner ring 18 of convex radiator 13. This combination provides the second radiator 16 with a triangular shape, one side of the triangle i.e., inner ring 18 being substantially in the plane of resonator 14, the other side 17 being inclined towards stem 12. There are thus two radiators facing resonator 14, a first radiator 13 whose concave face 13a is beamed towards the resonator 14 by its curved surface, and a second radiator 16 having a triangular shape, the apex 19 of the triangle being so disposed with reference to the resonator as to recapture energy forthcoming from the resonator.

Figure 2:
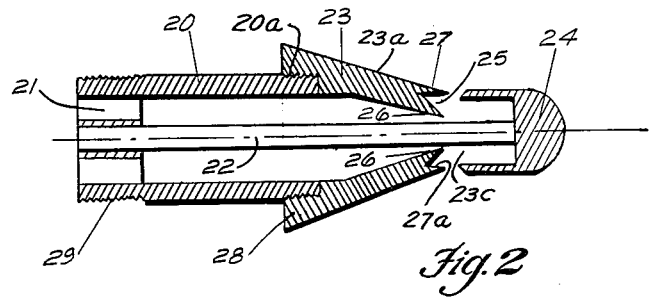
FIG. 2 shows a longitudinal cross sectional view of another embodiment of a stem generator contemplated herein.
Figure 3:
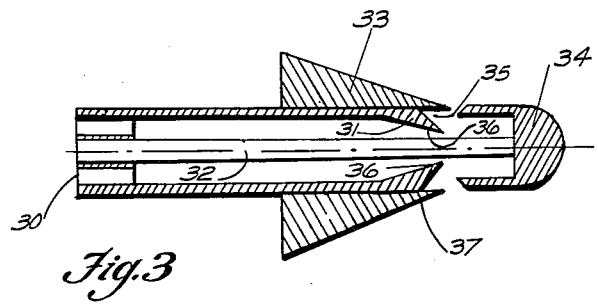
FIG. 3 illustrates a longitudinal cross-sectional view of still another embodiment of the present invention.
Figure 3A:
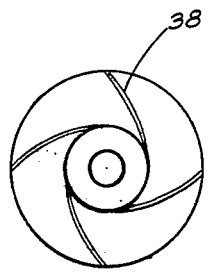
FIG. 3a is an end view of the device shown in FIG. 3 along lines 3a—3a thereof.

If a convex radiator is not needed, another embodiment may be used. Thus, in FIGURE 2 there can be provided a threaded cylinder 20 having spacers 21 adapted to hold the stem 22 axially in the cylinder 20. At the forward end of the cylinder screwed over the threads 20a is a nozzle radiator 23 of conical shape, the slope 23a of the cone being inclined towards the cylindrical resonator 24, the conical-shaped nozzle radiator 23 being truncated at a plane where the circular diameter of the truncated end is about equal to the cylindrical diameter of the resonator. Disposed in the truncated face 23c of the cone is a fixed second radiator 25 in the form of a dihedral cavity machined in the truncated face 23c. The inner rim 26 of said cavity is inclined towards the stem 22 and the inner face 27a of the outer rim 27 of the cavity is in a plane substantially parallel to the inner face of resonator 24. The exact disposition of the nozzle radiator 23 is adjustable by turning the nozzle base 28 on the threads 20a. The threaded cylindrical base 20 is affixed to fluid supply means by any convenient means, e.g., threads 29 in the vicinity of the spacers 21. If the screw attachment and adjustment is either not necessary or desired, the device 30 as shown in FIGURE 3 may comprise a base 31 without threads with a stem 32 therein. The conical radiator 33 is adapted to slide over the base 31 for adjustment with reference to the resonator 34, i.e., there is a sliding fit between the base, which in this case also acts as a nozzle 31, and the radiator 33 to vary the secondary resonance chamber or radiator 35. The disposition of wall 36 of radiator 35 varying with reference to wall 37 which forms part of conical radiator 33. To provide spin, swirl or rotation to the mass of fluid medium passing over it, radiator 33 may be milled with grooves 38 on its surface.

The present invention has particular utility for defoaming and to this end there is provided a device 39 as shown in FIG. 4 which includes a pipe or base 40 having flights or spacers 41 to support a hollow stem 42 centrally therein. The pipe 40 is adapted to carry the fluid medium to the nozzle 43, and the stem 42 passing through the pipe supports the resonator 44. Integral with nozzle 43 is a shock wave radiator 43a constructed in a concave shape with its boundary cross section in the shape of a polygon. The angles 43b of the polygon are chosen so small that waves coming off the corners may be considered Mach waves. In compression type of flow the Mach waves become steeper and steeper as the velocity decreases and in general will form an envelope, which corresponds to a shock wave. The fluid medium forced through the nozzle which is used to generate sound, follows the boundary of the polygon section of the shock wave reflector and will form a high speed laminar layer radiating outwards from the radiator. This flow induces a gas stream towards the resonator 44 which in turn will be forced to follow the laminar flow towards the rim of the shock wave radiator, i.e., towards rim 45. If fins 46 are cut in the secondary resonance cavity or radiator 47, shown in FIG. 4a, for the purpose of illustration as dihedral, they will act as guides and by varying the angle of these fins 46 in relation to the central axis, a spin, swirl or rotation can be imparted to the fluid mass emitted from the sound generator. In the drawing, FIG. 4, the gas flow is indicated by numeral 48a and the shock wave envelope by numeral 48b. For convenience, gas flow lines 48a are solid lines and shock wave envelope lines 48b are dotted lines.

It is also possible to have a device 49 with a convex shock wave radiator where the angles form a polygon section through it. As in the other embodiments, in FIGURE 5 the stem 51 is hollow and is fixed by means of a flight or spacer 52 to the pipe or base 50 to which is screwed the radiator 53 containing the secondary resonance cavity 54 opposed by the resonator 55. The outer wall 56 of the secondary resonance cavity or second radiator 54 lies in a plane substantially the same as the plane of the inner wall of the resonator 55, and the inner wall 57 of second radiator 54 is inclined towards the stem 51. The gas flow is indicated by sold line 58a and the shock waves by lines 58b. The shock waves are caused by angles 58 on radiator 53.

Instead of having the resonator affixed to the stem as hereinbefore described, a device can be provided where the resonator is attached to the nozzle 59. Thus, in FIGURE 6 a hollow stem 62 may be held in the nozzle 60 by means of a flight or spacer 61. The hollow stem 62 projects from the nozzle towards the resonator 64 but not into it. The resonator 64 is self supported coaxially to the nozzle by means of a cage 64a which contains a screw ring 64b to affix it to the nozzle. The radiator 63 is also screwed onto the nozzle. Holes 62a are located at the tip of hollow step 62 and provide a means for injecting a fluid into the zone of sound generation approximately midway between the nozzle tip 62b and the resonator lip 65a. A cavity for secondary resonance or a second radiator 65 is formed between the nozzle 60 and screw ring 64b at the base of the resonator supporting cage 64a. First radiator 63 has a concave face 66, and the walls 67 and 68 of the second radiator may be adjusted by turning the cage 64a.

In addition to the secondary resonance chamber or second radiator already described, it is also possible to have a resonance chamber on the resonator slide or in other words, a second resonator, i.e., in all there would be two radiators and two resonators as shown in FIGURE 7. In this device 69, the nozzle 70 has a second radiator 75 as an integral part of the nozzle tip. The resonator 74 contains a second resonator around its lip 76. The resonator is joined to the nozzle 70 by a plurality of vanes 73 which are placed and fixed at any desired angle to impart spin or swirl to the fluid medium issuing forth from between the resonator 74 and the nozzle 70. In this arrangement, a hollow stem 72 for conveying a fluid medium is supported by flights 71 centrally inside the nozzle 70. Holes 77 are provided at the tip of the stem for ejecting fluid into the zone of sound generation past the end of the nozzle tip 78. Device 79 depicted in FIG. 8 provides the arrangement whereby a shock wave radiator 84a, and in this case it is the main radiator, is machined integral with the resonator 84 in addition to which a secondary resonator chamber or second resonator 85b has been machined around the lip of the resonator. The radiator, resonator and second resonator combination 84, 84a, 84b, is supported coaxially from the nozzle 80 by means of blades 83 which are welded to a ring 88 containing screw threads which allow it to be screwed to nozzle 80. A hollow stem 82 is independently mounted centrally inside nozzle 80 by means of a spacer 81 and projects through the nozzle but not inside the resonator cavity. The hollow cavity inside the stem permits fluid to be pumped to the point of sound generation midway between nozzle tip 86 and resonator 84 through holes 87 in the tip of the stem.

As shown in FIGURE 9, the invention has special utility in the construction of a liquid fuel burner 89. The shock wave radiator 90 has machined in its tip 91 a second radiator 92. The surface 93 of the radiator is concave and machined in the shape of a polygon providing small angles 94 for forming shock waves. The resonator 95 or oscillator is supported in coaxial opposition to the nozzle by being mounted on a hollow stem 96 through which runs a hollow cavity 96a. Holes at the tip 96b provide a means for feeding liquid fuel to the sound generation zone where sound intensities of over 150 db instantly atomize the fluid and mix it with the oxidizer used for sound generation and combustion. The oxidizer is fed through pipe 97 into the body chamber 98 and through a pipe 99 towards the nozzle. In order to control the flow of liquid fuel, a needle valve 100 is fitted to the hollow stem 96. An inlet fuel line conveys the fuel to the needle valve. In an alternative arrangement, the fuel could be injected beyond the resonator by passing the hollow stem 96 through the resonator and by providing holes for fuel injection at the tip. The foregoing arrangement can provide fuel atomization, mixing of fuel and oxidizer, turbulence sound inside a flame mass.

For the purpose of giving those skilled in the art a better understanding of the invention, the following illustrative example is given:

EXAMPLE

Problem

Different cultures (such as penicillin) are grown in liquid media and transferred from one fermenter to another as production increases. The broth is continually agitated by means of a stirrer and oxygen is fed into the fermenters through air sparge pipes at the base of the vessel. As the antibiotic culture multiplies the broth thickens and given certain conditions, foam is produced within the mixture and by the air pumped through it. This foaming takes place without warning and cannot be controlled in the raw product by varying the constituents, temperatures or other production techniques. All fermenters, of which there are some 100, 12'-0" in diameter, and possibly another 100 from 2' to 12' diameter are therefore not fully utilized as waste space above the liquid level is available to accommodate excess foaming conditions. The foaming condition cannot be predicted. A batch may suddenly foam violently or it may foam continuously at a slow rate or at rates somewhere inbetween these two extremes. The entire operation takes place under conditions of extreme sterility, which is necessary because one stray microbe in the broth can contaminate several hundred thousand dollars worth of antibiotic. For this reason, any possible path between the atmosphere and the inside of the fermenters must be prevented. One such leak is possible through the shaft packing and glands and for this reason the foam is never permitted to rise to the top of the tank where it could possibly contaminate the seal and provide a path for foreign bacteria.

Set Up

A fermenter 12" diameter by 35" deep complete with air sparger, mixer, steam and air supply for driving whistles was used to reproduce operating conditions. The cover plate was provided with an opening for insertion of the whistle.

Tests

Two broths were processed ranging from extremely stable foams to medium type foams comparable to average detergents and water mixes. A stem jet of the type depicted in FIG. 4 and weighing about 4½ ounces was compared with an exponential horn type monojet weighing about 4½ pounds. The results are given in the following table:

TABLE.—DEFOAMING TESTS

| Test No. | 1 | 2 | 3 | 4 |
|---|---|---|---|---|
| Liquid | B | B | D | D. |
| Whistle | Monojet | Stem jet | Monojet | Stem jet. |
| Driving Medium | Air | Air | Air | Air. |
| Pressure, p.s.i. | 67.5 | 25 | 67.5 | 25. |
| Frequency, kc | 10 | 9–10 | 10 | 9–10. |
| Intensity, db | 147–150 | | 147–150 | |
| (Foam at rest) Static, Sec | 3–4 | 1–2 | 3–4 | 1–2. |
| (Rate at which foam moves towards sound source) Dynamic, f.p.m. | 5–10 | 15–20 | 5–10 | 15–20. |
| (Distance from lip at which foam controlled) Prevention, inches | 15–20 | 6–8 | 12–15 | 6–8. |
| Remarks | Good foam control. | Excellent foam control. | Stable; Static unstable, dynamic large bubbles; Good foam control. | Very stable foam. |

It is to be observed therefore that the present invention provides for an improvement in a sound generator or whistle having a nozzle terminating in a jet which is opposed coaxially by a resonator, and having a reflecting radiator, which improvement includes providing a second radiator coaxially opposed to said resonator. To deliver a second phase fluid to a point of maximum sound intensity, a hollow stem can be provided in the nozzle extending beyond the nozzle towards or even supporting the resonator. The radiator may be concave or convex, e.g., frustro-conical depending on the effect desired, and may be even concave polygon-shaped or convex polygon-shaped; and the surface of both radiators may have grooves, vanes, or wings to impart spin or rotation, i.e., swirl-forming members. If the stem does not extend to the resonator, the resonator may be supported by means of a cage, e.g., swirl-forming members. In addition to a second radiator, a second resonator may be provided in the lip of the resonator.

Furthermore, it is to be observed that as used herein, the terms "sound," "sound generator," or "whistle" includes ultrasonics or ultrasonic devices, i.e., sound generators which produce no audible sound and whistles which don't whistle.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A sound wave generator, comprising in combination, a hollow cylindrical nozzle including a jet at one end thereof with an inwardly tapered outer wall at said one end; an elongated cylindrical stem mounted axially within said nozzle, a portion of said stem extending outwardly from said jet; a hollow cylindrical resonator having an open end and a closed end, including mounting means for mounting said resonator so that the open end thereof coaxially opposes and faces said jet; and, a radiator surrounding said jet including an inner ring carried by said nozzle over said jet, the combination of said inwardly tapered outer wall and said inner ring forming a second radiator.

2. A device as claimed in claim 1, said hollow cylindrical resonator being fixedly mounted by said mounting means on the outwardly extending portion of said stem.

3. A device as claimed in claim 1, said mounting means including a threaded cup mounted on the outwardly extending portion of said stem, and, a correspondingly threaded portion on said resonator retained by said threaded cup.

4. A device as claimed in claim 1, said inner cylindrical radiator wall being substantially in the plane of said hollow cylindrical resonator.

5. A device as claimed in claim 1, said radiator surrounding said jet being concave.

6. A device as claimed in claim 1, said radiator cross section being in the shape of a concave polygon formed by a plurality of intersecting faces so as to radiate shock waves therefrom.

7. A device as claimed in claim 1 including a plurality of swirl forming members, disposed in said formed second radiator.

8. A device as claimed in claim 1, said radiator surrounding said jet being convex.

9. A device as claimed in claim 1, said radiator cross section being in the form of a convex polygon, formed by a plurality of intersecting conical faces so as to radiate shock waves therefrom.

10. A device as claimed in claim 1, said hollow cylindrical resonator coaxially opposing and facing said jet including cage mounting means between said nozzle and said resonator.

11. A device as claimed in claim 1, said hollow cylindrical resonator coaxially opposing and facing said jet including a plurality of swirl forming members extending between said nozzle and said resonator to form cage mounting means.

12. A device as claimed in claim 1, said elongated cylindrical stem being hollow and having apertures in said stem outwardly extending portion to deliver a second phase fluid to a point of maximum sound intensity.

13. A device as claimed in claim 12 for use as a fuel burner including a chamber, said nozzle being affixed to one end thereof, a pipe coupled to said chamber for feeding an oxidizer thereinto, said hollow elongated cylindrical stem mounted axially in said nozzle passing through said chamber, and, an inlet fuel line coupled to said stem to carry fuel thereto.

References Cited in the file of this patent

UNITED STATES PATENTS

| | | |
|---|---|---|
| 1,796,887 | Critchfield | Mar. 17, 1931 |
| 1,980,171 | Amy | Nov. 13, 1934 |
| 2,238,668 | Wellenstein | Apr. 15, 1941 |